(12) United States Patent
Walter et al.

(10) Patent No.: US 7,974,010 B2
(45) Date of Patent: *Jul. 5, 2011

(54) ZERO-ORDER DIFFRACTIVE PIGMENTS

(75) Inventors: Harald Walter, Horgen (CH);
Alexander Stuck, Wettigen (CH)

(73) Assignee: CSEM Centre Suisse d'Electrique et de Microtechnique SA—Recherche et Developpement, Neuchâtel (CH)

( * ) Notice: Subject to any disclaimer, the term of this patent is extended or adjusted under 35 U.S.C. 154(b) by 98 days.

This patent is subject to a terminal disclaimer.

(21) Appl. No.: 12/301,608

(22) PCT Filed: Mar. 8, 2007

(86) PCT No.: PCT/CH2007/000127
§ 371 (c)(1),
(2), (4) Date: Nov. 19, 2008

(87) PCT Pub. No.: WO2007/137438
PCT Pub. Date: Dec. 6, 2007

(65) Prior Publication Data
US 2009/0257126 A1 Oct. 15, 2009

Related U.S. Application Data

(60) Provisional application No. 60/874,277, filed on Dec. 12, 2006, provisional application No. 60/809,417, filed on May 31, 2006, provisional application No. 60/809,385, filed on May 31, 2006.

(51) Int. Cl.
*G02B 27/46* (2006.01)
(52) U.S. Cl. .................................. 359/562; 359/569
(58) Field of Classification Search .................. 359/562, 359/569
See application file for complete search history.

(56) References Cited

U.S. PATENT DOCUMENTS

| 4,484,797 A | 11/1984 | Knop et al. |
| 5,135,812 A | 8/1992 | Phillips et al. |
| 5,368,902 A | 11/1994 | Todd et al. |
| 6,749,777 B2 | 6/2004 | Argoitia et al. |
| 2002/0164456 A1 | 11/2002 | Souparis |

FOREIGN PATENT DOCUMENTS

| FR | 2888491 | 1/2007 |
| WO | WO-03/102084 | 12/2003 |
| WO | WO-2004/024836 A3 | 3/2004 |
| WO | WO-2005/026848 A3 | 3/2005 |

OTHER PUBLICATIONS

Gale, M.T., "Zero-Order Grating Microstructures," Second Edition of Optical Document Security, pp. 267-287 (1998).
Gale et al., "Zero-Order Diffractive Microstructures for Security Applications," *SPIE vol. 1210, Optical Security and Anticounterfeiting Systems*: 83-89 (1990).
Mashev et al., "Zero Order Anomaly of Dielectric Coated Gratings," *Optics Comm.*, 55(6):377-380 (1985).
Rosenblatt et al., "Resonant Grating Waveguide Structures," *IEEE Jour. of Quan. Elec.*, 33(11):2038-2059 (1997).
International Search Report from the European Patent Office in corresponding PCT/CH2007/000127, dated Jun. 11, 2007.

*Primary Examiner* — Joshua L Pritchett
(74) *Attorney, Agent, or Firm* — Marshall, Gerstein & Borun LLP (57) ABSTRACT

The present invention relates to pigments comprising or consisting of a layer made of a material with an index of refraction that is higher than the index of refraction of the adjacent material by at least 0.25; whereas said layer has a zero-order diffractive micro-structure; whereas said layer acts as an optical waveguide and whereas said layer has a thickness between 50 nm and 500 nm; to processes for its manufacture and to its use. These pigments show a color effect upon rotation and/or tilting, and it is believed that this color effect is based on zero-order diffraction.

25 Claims, 5 Drawing Sheets

ZERO-ORDER DIFFRACTIVE PIGMENTS

The present invention relates to pigments showing a colour effect upon rotation and/or tilting, in particular to colour effect pigments wherein the colour effect is based on zero-order diffraction, to processes for its manufacture and to its use.

Physical colour: It is known to obtain physical colour either by first and higher order diffraction of a surface grating or by flat dielectric layer stacks or Fabry-Perot type layer stacks (interference filters) which are disclosed in U.S. Pat. No. 3,858,977. It is also known that physical colours can be obtained by combining very fine, subwavelength gratings, with one or several dielectric and/or metal stacks on it. Such so called zero order diffractive filter (ZOD filter) or zero order diffractive device (ZOD device) uses zero order diffraction to produce very pronounced colour effects as described in U.S. Pat. No. 4,484,797. Main features and advantages of ZOD devices are:
   Iridescent optical effect, which varies with tilting angle $\Theta$ and/or rotation angle $\phi$
   optical effect is easily recognized by untrained people
   optical effect is machine readable
   Strong colour effect, even under diffuse lighting conditions
   Cost effective, mass producible technique are available
   Very difficult to counterfeit, as the optical effect depends on the material properties. the deposition of high index material on 2 different levels combined with an extremely fine, sub-wavelength grating. Copying only the grating or the material stack will not produce the desired effect.

Figure 11:
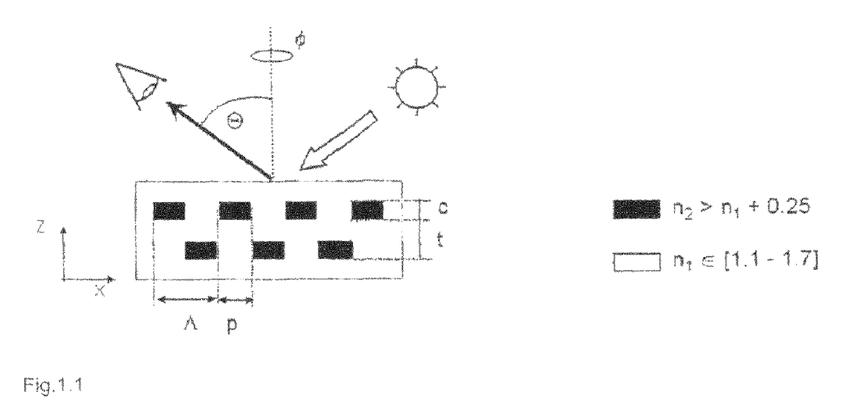
Figure 12:
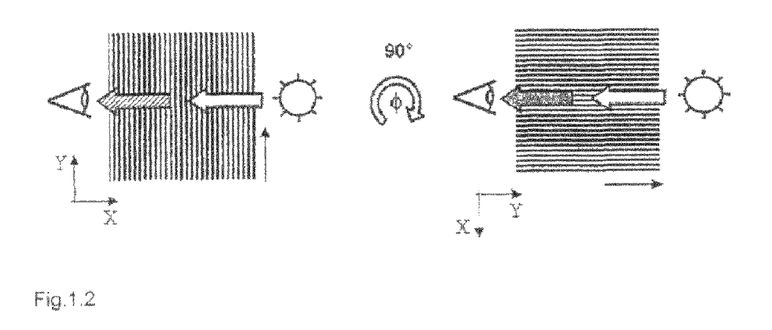

ZOD devices: As is shown in FIG. 1.1, a typical ZOD structure consists of a low index of refraction (LRI) material (white, $n_1$ in the range of 1.1-1.7) in which segments of a material (HRI layer) with a higher index of refraction (black, $n_2 > n_1 + 0.25$) are regularly arranged on a periodic microstructure, e.g. parallel or crossed grating lines. More general either the waveguiding layer is modulated with the diffractive microstructures or the microstructures are placed on top or below this layer. The material above and below the waveguide can have a different index of refraction. One can even be air. In order for zero order diffraction to take place a number of parameters have to be adjusted including microstructure period $\Lambda$, microstructure depth t, thickness of the waveguiding layer c, the fill factor or duty cycle $f.f. = p/\Lambda$ and the microstructure profile or shape (rectangular, sinusoidal, triangular or more complex). The period of the microstructures is smaller than the wavelength of light for which the filter is designed. If illuminated by white light, this ZOD structure directly reflects a particular spectral range or colour very efficiently. This comes from a resonance effect in the sub-wavelength grating structured waveguiding HRI layer. This layer acts as a leaky waveguide. Therefore ZOD filters are sometimes called resonant gratings. A part of the light incident at an angle $\Theta$ is directly transmitted and a part is diffracted and trapped in the waveguiding layer. Some of the trapped light is rediffracted out and interferes with the transmitted part. At a certain wavelength and angular orientation $\phi$ of the periodic microstructure a resonance occurs which leads to complete destructive interference. No such light is transmitted. Contrary to first or higher order diffraction devices, in ZOD devices or ZOD filters the light is reflected at a viewing angle which is equal to the incidence angle $\Theta$. As long as the materials used possess no absorption the transmission spectra are the complement of those in reflection. More details concerning zero-order diffractive filters can be found in M. T. Gale, "Zero-Order Grating Microstructures" in R. L. van Renesse, Optical Document Security, 2nd Ed., pp. 267-287. The reflected and transmitted colour depends on the orientation of the grating with respect to the observer. As is indicated in FIG. 1.2, the colour changes upon rotation about the surface normal ("colour flip"). Depending on the symmetry of the grating, different rotation angles can be achieved. In linear gratings, the spectra are identical, if the ZOD grating is rotated by 180°, but a strong colour flip occurs upon 90° rotation. In 2-dimensional gratings, 60° and 90° symmetric colour flip effects can be easily made, other values are also possible. Reflectivity of 100% at specific wavelengths is theoretically possible; in practice values up to 80-90% are observed.

Manufacturing of ZOD filters: It is known to manufacture ZOD filters as laminated foils in roll to roll processes with thermally evaporated ZnS as the HRI layer deposited on foil substrates which were micro-structured by hot-embossing.

Use of ZOD filters: It is known to use the foils manufactured as described above as security features for passport and document protection, as well as in banknotes. ZOD filters are considered a natural successor of the now widely used holograms for security applications. A main reason is that ZOD filters are more difficult to counterfeit, yet use the same basic production technologies, as holograms. Further, ZOD filters are better visible for the human eye and can be easily checked with simple machines.

Colour shifting pigments: It is also known that colour shifting pigments can be manufactured by multilayer deposition of alternating high and low index of refraction layers or a Fabry-Perot type interference layer stack. The colour shifting comes from thin film interference effects in the multilayer stacks.

U.S. Pat. No. 5,135,812 describes processes for manufacturing such pigments based on vacuum deposition. On one surface of a flexible web of material an optically variable thin film coating is formed. The coating is separated from the web to form optically variable thin film flakes. The flakes are disposed in ink and paint vehicles to provide optically variable inks. It is considered disadvantageous that the thus obtained pigments do not show a pronounced colour effect upon rotation. Furthermore at least five layer must be deposited which is rather costly and leads to thick pigments. Typically such pigments are on the order of 1 µm thick.

WO98/53012A1 describes alternative methods to manufacture pigments with such multilayer stacks based on deposition of the layers from gas or liquid phases. Multi-coated interference pigments which are obtained by hardening and by hydrolysis of an aqueous solution of a titanium compound which can be thermally hydrolyzed on a continuous strip are described. The layer thus arising is separated from the strip and breaks to form flakes. The flakes thus obtained are alternately coated with a metal oxide hydrate with a high refractive index and a metal oxide hydrate with a low refractive index, by hydrolyzing the corresponding water-soluble metal compounds after or without intermediate drying in a wet process. Again, it is considered disadvantageous that the thus obtained pigments do not show a pronounced colour effect upon rotation. Further at least five layers must be deposited to obtain reasonable colour effects upon tilting resulting in thick pigments.

Diffractive pigments: WO03/011980A1 describes diffractive pigment flakes including single layer or multilayer flakes. The flakes comprise a layer having a reflective surface and a diffractive structure formed on the reflective surface, wherein the pitch and amplitude of the structure are selected to decrease the intensity of a zero order diffracted light beam in order to increase the intensity and colour contrast of higher order diffracted light beam. Methods to manufacture such pigments by vacuum deposition are mentioned. As the colour effect of such pigments is based on first or higher order diffraction only the typical rainbow colour effect of holograms can be realised.

WO04/024836 describes first and higher order diffractive pigments, which separate light into spectral components, similar to a prism, and which include a magnetic layer to selectively align the pigments. This document does not disclose or contemplate zero-order diffractive pigments.

In consequence, there is a need for pigments showing a colour effect upon rotation and/or tilting and for suitable manufacturing processes. Further there is a need for thinner physical colour pigments compared to state of the art ones. The latter enables the use of more printing and coating techniques for the deposition of lacquers containing the pigments compared to lacquers containing state of the art physical colour pigments.

Thus, it is an object of the present invention to mitigate at least some of these drawbacks of the state of the art. In particular, it is an aim of the present invention to provide new pigments showing a colour effect upon rotation and/or tilting and to provide manufacturing processes for obtaining such pigments. A further aim of this invention is to provide thinner pigments compared to state of the art physical colour pigments.

These objectives are achieved by a pigment as defined in claim 1 and by a manufacturing process as defined in claim 11. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

Zero-order diffractive pigments ("ZOD pigments") are pigments showing a colour effect (i.e. change of colour) upon rotation and/or tilting, wherein said colour effect is based on zero-order diffraction.

A material is considered "embossable" if it maintains the structure of an embossing tool on its surface after subjecting it to an embossing step.

A "periodic microstructure" is a periodic structure having a period between 100 nm and 600 nm.

The term "pigment" is known in the field. It relates to solid particles, each particle showing a colour and/or a colour effect. Advantageously, said particles have maximum diameters below 100 micrometers (μm), particularly below 20 μm. Advantageously, such particles are flake-shaped, i.e. they are thin when compared to its length and width.

The term "high index of refraction layer" ("HRI layer"), is known in the field. For example, the HRI layer can be made of ZnS, $TiO_2$, $Cr_2O_3$, AlN, $Al_2O_3$, $HfO_2$, $Nb_2O_5$, $Si_3N_4$, SnN, $Ta_2O_5$, $V_2O_5$, $WO_3$, or $ZrO_2$, or similar inorganic materials or high-index polymers like HRI721 and HRI751 (optimate).

The present invention will be better understood by reference to the figures.

FIG. 1.1 shows a schematic side view drawing of a known ZOD device. Black denotes HRI material, white low index of refraction material. Λ is the period and t the depth of the microstructure, p the width of the upper microstructure line, φ the rotational angle, Θ the viewing angle and c the thickness of the HRI layer.

FIG. 1.2: Schematic drawing of the top view on a ZOD device describing the colour flip upon rotation about the surface normal for a linear grating. E.g. green light is reflected in a certain viewing angle if the grating lines are perpendicular to the direction of reflection (left part). Rotating the ZOD device by 90° turns the colour from green to red. The grating lines are now in line with the direction of reflection (right part). Other grating symmetries produce other rotational angles.

FIG. 1.3a: Alternative ZOD pigment grating shapes: Sinusoidal (above) and triangular (below). Combinations of these two shapes and combinations with rectangular shapes also exhibit zero-order diffraction.

FIG. 1.3b: Possible asymmetric ZOD pigment grating shapes: Asymmetric triangular (above) and asymmetric rectangular (below).

FIG. 1.4: ZOD pigments (black grating) embedded in paste, liquid, powder or polymer.

FIG. 1.5: ZOD pigments (black grating) coated with a polymer, sugar etc to make a small powder particle mixed into other powder particles (light grey).

FIG. 1.6: A multilayer ZOD pigment structure is shown by way of example. In this particular case, the lateral dimension of the pigment is about 4 grating periods. The distances are smaller than 1 micrometer, typically 500 nm or less, allowing for mutual optical interference between the layers.

FIG. 1.7: A mirror-ZOD pigment structure is shown by way of example. In this particular case the lateral pigment dimension is about 4 grating periods. The black bottom is the reflecting mirror structure, it might be corrugated. Again, typical distances are smaller than 1 micrometer, typically, 500 nm or less, allowing for mutual optical interference between all layers.

FIG. 2.1 schematically shows a process for manufacturing ZOD pigments as described herein.

FIG. 2.2: schematically shows an alternative process for manufacturing ZOD pigments as described herein. It is possible to arrange the first 3 steps in different orders. The geometry of the knife separators during embossing can be different, for example rectangular. Also a depression instead of an enhancement will provide the separator function. However, the height of the knife edge is larger than the full thickness of the dielectric stack.

In more general terms, in a first aspect, the invention relates to a pigment, in particular zero-order diffraction pigment ("ZOD pigment"), comprising or consisting of an optical waveguiding layer (HRI layer), whereas said layer is made of a material with an index of refraction that is higher than the index of refraction of the adjacent material by at least 0.25; whereas said layer has a zero-order diffractive grating structure and whereas said layer has a thickness between 50 nm and 500 nm.

In an advantageous embodiment, the invention relates to a pigment as described herein wherein the zero-order diffractive grating structure posses a period that is smaller than the wavelength of the light which shall be reflected in the zeroth reflection order.

In a further advantageous embodiment, the invention relates to a pigment as described herein wherein the zero-order diffractive grating structure has a period between 100-600 nm, a grating depth between 30-300 nm's, preferably 150 nm or less.

In a further advantageous embodiment, the invention relates to a pigment having a thickness between 100 nm to 2 micrometer and a lateral size between 1 and 100 micrometer. The shape of such pigments can be arbitrary, advantageous shapes are rectangular, triangular, hexagonal, or pentagonal.

Although ZOD effects on large area (>2 mm²) are known (e.g. U.S. Pat. No. 4,484,797), the size effect of ZOD has not been investigated to date. It was surprisingly found that ZOD effects already appear if the grating laterally extends over at least 3 grating periods, as the calculations and experiments involved are difficult. Therefore not only large area ZOD colour effects are possible, but colour pigments based on zero-order diffraction, with a lateral size of at least 1 micrometer can be manufactured. The reflection spectrum of such colour pigments depends besides the above mentioned parameters on the size and shape of the pigment. Without being bound to theory it is believed that for example pigments with a grating period between 300 nm and 500 nm or less and a lateral size of between 1-2 micrometers have broader reflection peaks than pigments with the same grating but a lateral size of 10 micrometers or more.

Figure 13:
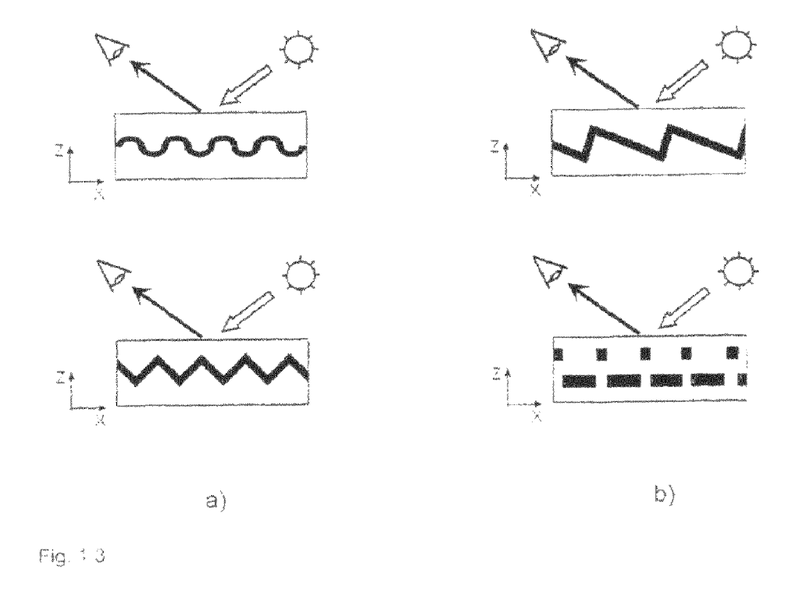

In one embodiment of the invention, the following parameters have to be fulfilled: The grating period has to be smaller than the wavelength of the diffracted light. Typical grating periods $\Lambda$ are in the range between 100 nm-600 nm, particularly 300-500 nm. Typical grating depths t are between 30-300 nm, preferably 150 nm's or less. For dielectric materials, the useful thickness c strongly depends on the grating and the material properties, however, typical thicknesses are in the range of 30 nm's-250 nm's. A suitable range for the fill factor $f.f.=p/\Lambda$ is 0.3-0.8, preferably 0.4-0.7. The grating profile also affects the reflection spectrum. Possible grating profiles are rectangular, curved (e.g. sinusoidal), triangular and combinations of these three basic shapes. Advantageous examples of grating shapes are shown in FIGS. 1.1 and 1.3.

In an advantageous embodiment, the invention relates to ZOD pigments comprising of particles having an anisotropic lateral shape, in particular an elongated lateral shape. In general, ZOD devices change their colour at different polar angles (theta). This gives ZOD pigments an iridescent appearance when applied to a surface, similar to the colour shifting effects observed with the well established colour shifting interference pigments (U.S. Pat. No. 5,135,812). Further, ZOD devices with linear, one dimensional gratings show a distinct colour flip under 90° rotation about the surface normal. In ZOD pigments, which are deposited with an arbitrary orientation, the colour flip is not observable by the human eye any more. Only the dependence on the polar angle theta will remain. However, if the pigment shape is strongly anisotropic, for example, rectangular, and the deposition method favours the alignment of one direction, then the deposited colour pigments will still show a colour flip effect, i.e., the surface will change the colour when it is rotated about the surface normal. Suitable pigments comprise rod-shaped particles, in particular rectangular particles, with a width to length ratio in the range of 1:2 to 1:10, in particular 1:5 (e.g. 10×50 micrometers). This can be achieved for example, by depositing long, narrow, rectangular pigments on a surface in a wet coating process with or without a polymeric binder. Printing, especially flexo-printing, ink jet-printing or screen-printing, curtain or dip coating and spraying are suitable techniques. It was found advantageous, if the dried layer has a thickness less than 2 times the longer dimension of the pigment side, resulting in a layer which is at maximum a few micrometers thick.

In a further advantageous embodiment, the invention relates to ZOD pigments as described herein that contain a magnetic layer. If one or more magnetic layers are incorporated into the ZOD pigments, it is also possible to magnetize them in one direction during manufacturing and align the pigments magnetically during deposition. Such a magnetic layer could be for example made of chromium oxide, metallic iron, iron oxide, metallic Ni and the like. Preferred one or more spacer layer separate the waveguiding layer or layers from the magnetic layer or layers, as most magnetic materials are absorbing in the visible spectral range. The deposition of magnetized pigments then allows writing an optical pattern in the visible, UV and IR region, magnetically, by locally changing the magnetic filed during the printing of the pigments. This leads to printed areas with pigments oriented in different directions. No other known optical technique has this capability. Obviously, such magnetic ZOD pigments can be used to measure the spatial distribution of magnetic fields with high resolution and a simple colour camera.

Figure 16:
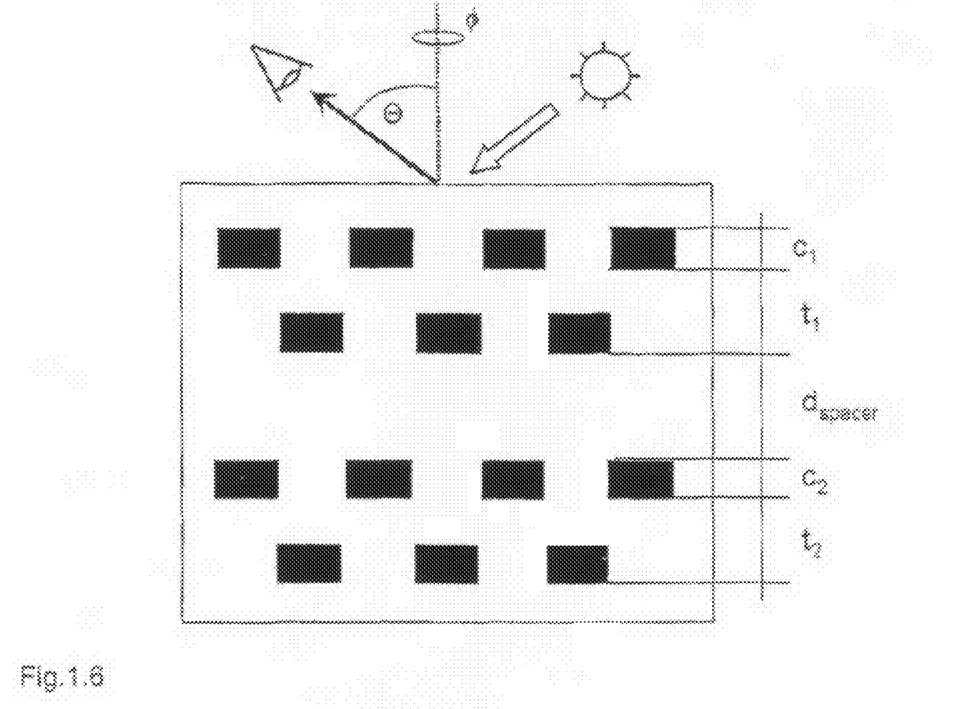
Figure 17:
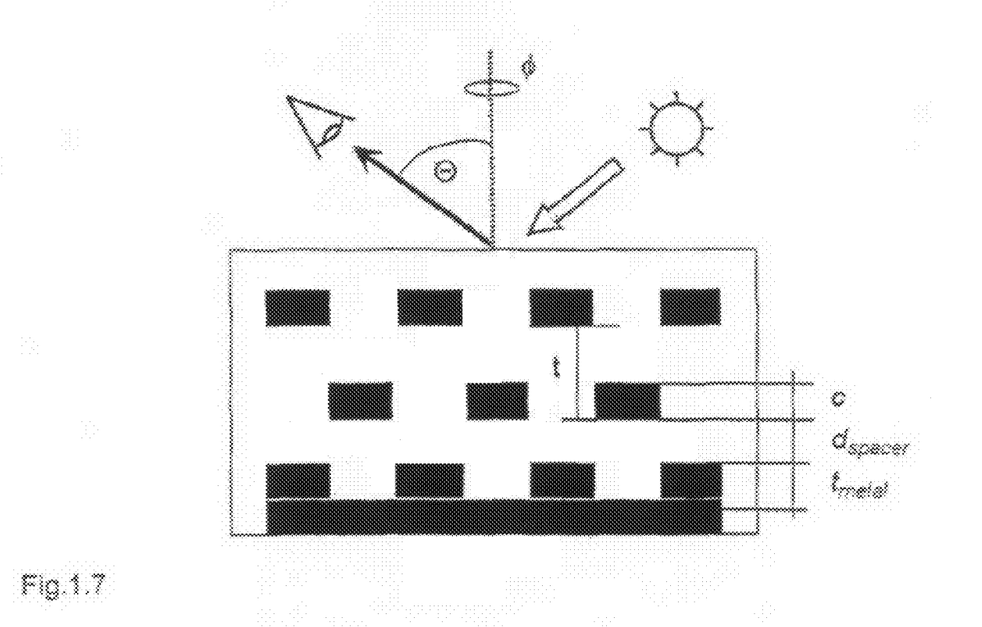

In a further advantageous embodiment, the invention relates to ZOD pigments comprising multilevel systems. In the context of this invention, multilevel systems are such systems that contain in addition to the periodic microstructure and the waveguiding layer additional elements that influence optical properties, such as further periodic microstructures and waveguiding layer, dielectric layers or metallic layers. In particular, such multilevel systems, comprise i) several (2 or more) dielectric layers on top of the periodic microstructure or ii) combinations of ZOD filters with metallic layers or iii) combinations of both. A preferred embodiment is to stack similar or identical ZOD filters on top of each other. This will enhance the colours, because light that is transmitted by one ZOD layer is partially reflected by the layer underneath, therefore increasing total reflectivity. In such an arrangement, novel spectra appear, if the separation between the dielectric layers is smaller than about 1 micron. In this case, each dielectric layer does not act as an independent ZOD filter, but the layers will mutually interfere to give stronger and different colour spectra. The schematics of one possible such multilayer arrangement is shown in FIG. 1.6. Another possibility to make complex ZOD pigments is to combine Zero-Order diffractive structures with metallic or dielectric mirror structures, for example the stack on the grating might contain one or several, fully reflective or semi-transparent metallic layers, 5-100 nm's thick of Al, Ag, Au, Cr, Cu and their alloys or similar metals. Here strong colours will be observed, if the mirror is placed close to the HRI layer, i.e. if the thickness of each single layer is less than 1 micron. As shown in FIG. 1.7, the colour is due to additional interference between the mirror and the conventional ZOD pigment structure.

In a further advantageous embodiment the invention relates to a ZOD pigment wherein the HRI layer is made of material suitable for human administration, such as $TiO_2$ or similar edible materials, embedded in a digestible powder. Such a powder could be the mass mixture of a pharmaceutical pill, organic food, toothpaste and similar material. A typical example of a pharmaceutical composition, used in pills is: Lactose Monohydrate (72.5%); Microcrystalline Cellulose (4.25%); Aerosil (colloidal silica, anhydrous; 1.00%); Magnesium-stearat (1.00%); Na-salicylat (exemplary active agent, 1.00%)

Figure 15:
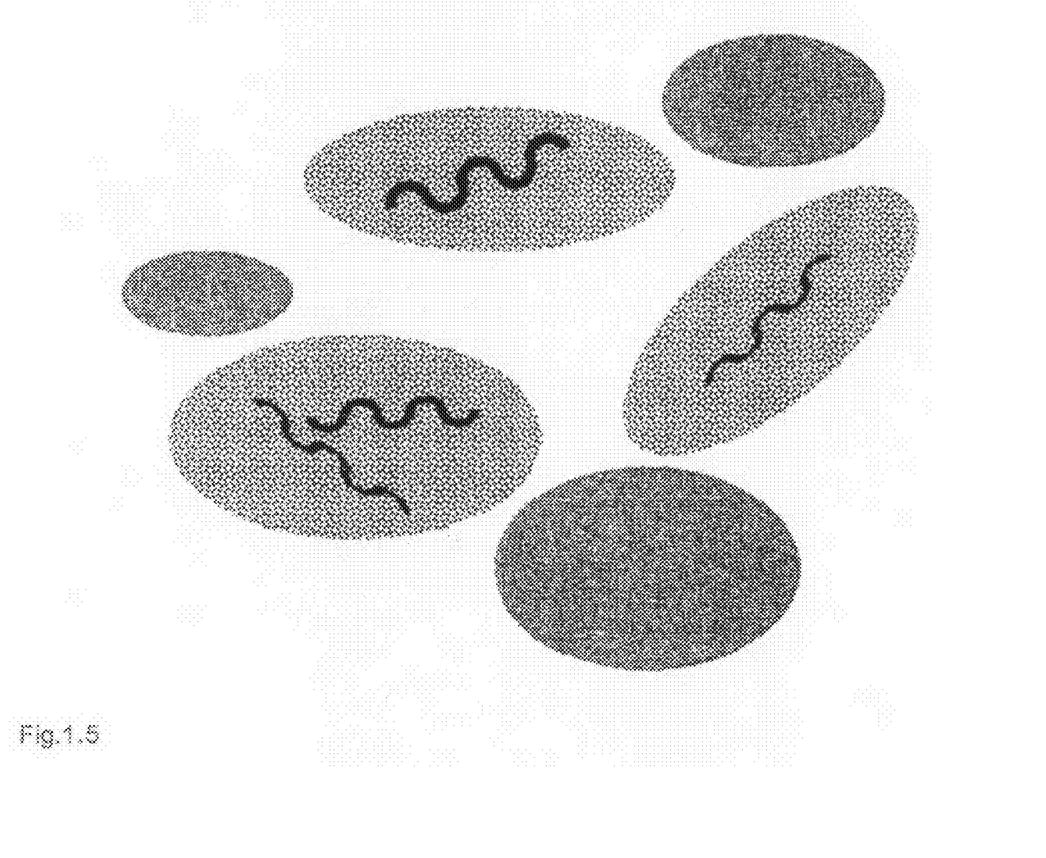

In a further advantageous embodiment, the invention relates to one or more ZOD pigments embedded in an organic or inorganic droplet and fixed within this droplet. As shown in FIG. 1.5, these droplets are then used as fillers in a powder, paste or gel or also incorporated in liquid or plastic. For pharmaceutical applications or applications in the food industry, the ZOD pigments as described herein might be coated with or embedded in sugars.

In a further embodiment, the invention relates to ZOD pigments consisting of a layer made of a material with an index of refraction that is higher than the index of refraction of the adjacent material whereas the layer has a diffractive grating structure with a period that is smaller than the wavelength of the light which shall be reflected in the zeroth reflection order, preferably between 100-600 nm's, Typical grating depths are between 30-300 nm's, preferably 150 nm's or less, whereas the layer acts as an optical waveguide and whereas the thickness of the waveguiding layer is between 50 nm and 500 nm.

Figure 14:
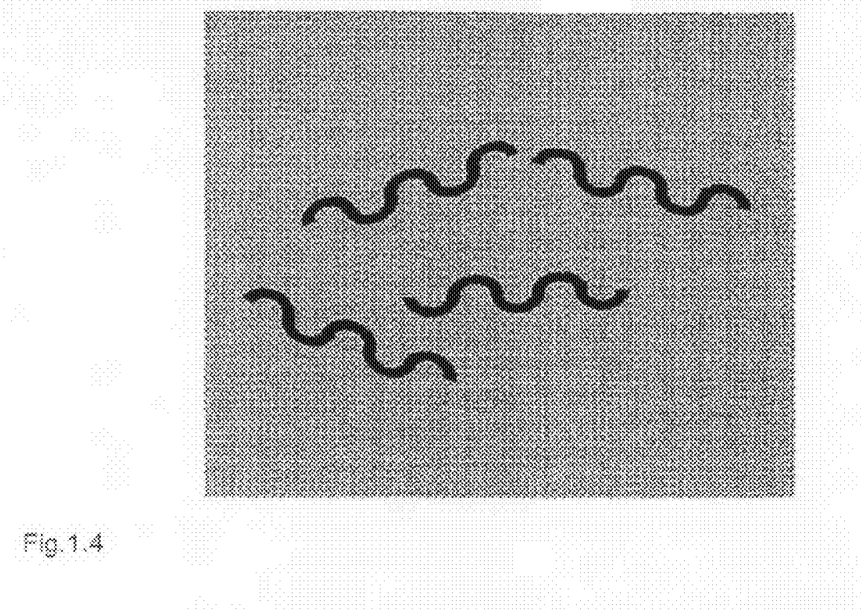

In a further advantageous embodiment the invention relates to a matrix, such as a coating, glaze or lacquer comprising ZOD pigments as described above. A suitable matrix possess an average optical index of refraction at least 0.25 lower than the refractive index of the HRI layer of the ZOD pigment; c.f. FIG. 1.4.

In a second aspect, the invention relates to processes, in particular mass production processes, for manufacturing ZOD pigments as described herein comprising the steps of i) depositing and optionally micro-structuring on a substrate a first layer which is dissolvable in a first solvent; ii) manufacturing one or more layers of said ZOD pigment by one or more deposition steps and optionally one or more micro-structuring steps wherein all additional layers are insoluble in said first solvent; iii) dissolving said first layer; iv) optionally subjecting the obtained ZOD substrates/ZOD pigments to one or more further coating steps and v) optionally subjecting the obtained ZOD pigments to one or more selection steps as to size and/or shape, wherein at least one micro-structuring step takes place in i) or ii). In the context of this invention, micro-structuring steps are those process steps that produce a micro-structure to one of the manufactured layers; embossing steps are a typical example. In the context of this invention, mass production processes are those processes, that result in large amounts of ZOD pigments; roll-to-roll processes are a typical example.

Similar to the interference layer stack pigments (discussed above), ZOD pigments can be obtained by flaking the high index coatings after micro-structuring and deposition on a flexible web. This can be done by vacuum deposition and embossing methods on large area in roll-to-roll ("R2R") processes. Equipment used for roll-to roll processes is known in the field and may also be used for the manufacturing processes for ZOD pigments as described herein. Thus, in an advantageous embodiment, all steps of the ZOD filter manufacturing process are adapted to fit into such R2R process. Such R2R processes are considered advantageous due to relatively low production costs and high manufacturing speed.

Figure 22:
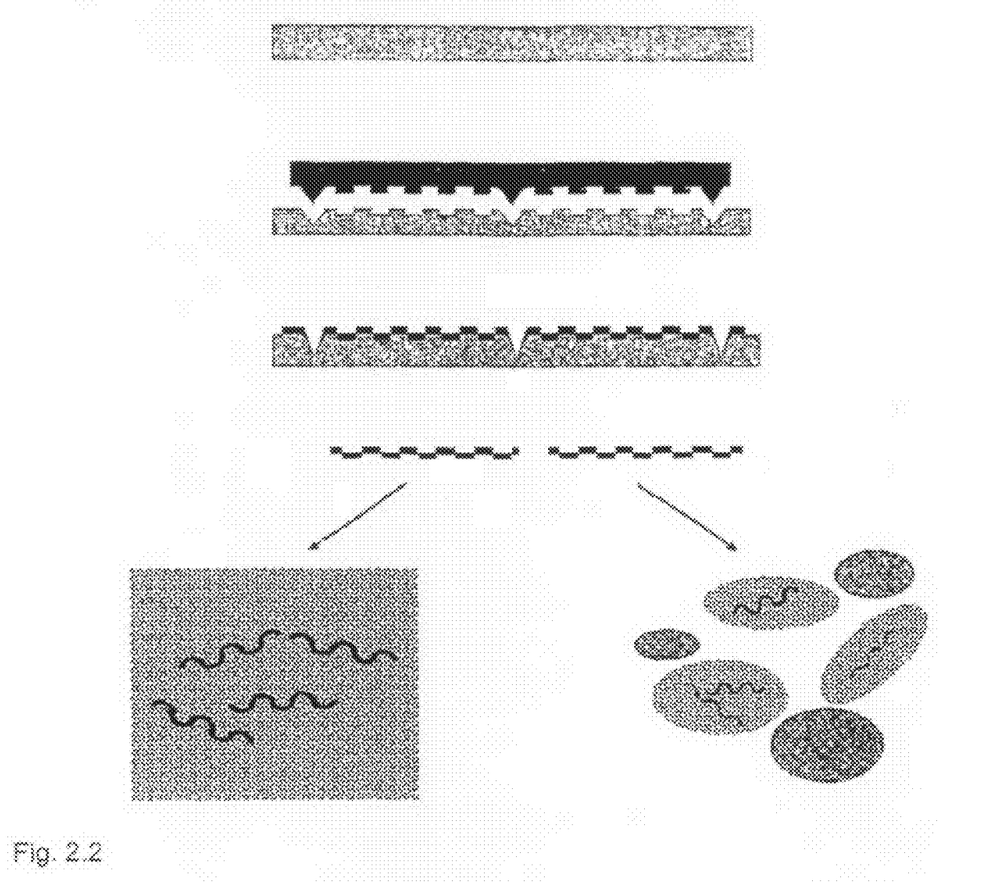

In an embodiment, a first manufacturing process of a ZOD pigment will have the following steps (c.f. FIG. 2.2):

1. Hot- or cold embossing of a periodic microstructure ("the grating") into a deformable polymer foil or deformable layer on a polymer foil ("carrier foil"). Suitable materials for the polymer foil ("carrier foil") are thermoplastic polymers. E.g. the carrier foil can be made of acrylonitrile butadiene styrene ABS, polycarbonate PC, polyethylene PE, polyetherimide PEI, polyetherketone PEK, poly(ethylene naphthalate) PEN, poly(ethylene therephtalate) PET, polyimide PI, poly(methyl methacrylate) PMMA, poly-oxy-methylene POM, mono oriented polypropylene MOPP, polystyrene PS, polyvinyl chloride PVC and the like. Suitable materials of the polymeric, deformable layer are poly(vinyl alcohol) PVA, poly(vinyl pyrollidone) PVP and other suitable thermoplastic and coatable polymers. The grating master tool used for embossing, can be metallic, for example a Ni or Steel foil or sheet or plate or roll, with or without Cr surface finish. It might also be made of MoC or WC and the like.

2. Deposition of at least one HRI layer, typically by thermal evaporation, plasma deposition, sputtering or gravure printing. Several stacks of alternating high and low index layers might be deposited. The thickness of each layer is less than 1 micrometer, typically between 50 nm-500 nm. Thin metal layers might also be deposited by thermal evaporation, plasma deposition or sputtering. The thickness of these layers is typical in the range of 5 nm to 150 nm.

3. The pigments can be peeled off mechanically by dissolving the embossing layer. The pigments can be dissolved in a liquid after the deposition.

4. Pigments can be selected for size and shape, to further narrow down the size distribution. Several sizes can be manufactured at once with this technique.

5. The ZOD- or HRI-pigments are then embedded in paste, powder or distributed in a liquid or paste to be in a process able form.

In an advantageous embodiment, the grating master has small grating patches with borders, which are in the shape of the ZOD pigments. The edges of the gratings are either enhanced or depressed sufficiently, so that each grating on the master is well separated. The intermediate region serves as knife to separate the pigments. As the colour effect of the ZOD pigments can be size dependent, a close control of the pigment shape is needed, for reproducible results and narrow colour spectra. Such size control may be achieved by using a grating master as described herein, as the ZOD pigments shape is controlled at the stage where the grating is manufactured.

In an advantageous embodiment, a release layer is deposited on the embossable foil or layer or on the master tool, preferably on the master tool. This release layer serves as an anti-adhesion layer for the embossing or the HRI layer. Possible examples for release layers are Teflon, DLC, silanes and the like.

Nevertheless there is a need for an improved method to deposit the waveguiding HRI layer used in ZOD pigments to realise ever lower production costs. This may be achieved by gaseous or wet deposition methods on flake shaped substrates. Flake shaped substrates ("flakes") made of a material with an index or refraction at least 0.25 lower than the one of the waveguiding layer are needed, wherein the flakes must possess the subwavelength grating structure at least on one surface. Herein, methods to manufacture such flakes are described. Further methods to deposit the waveguiding layer on these flakes in non vacuum processes are described. In one embodiment the flakes are manufactured by depositing a LRI material by vacuum deposition on a flexible substrate bearing the embossed periodic microstructures. In another embodiment the LRI material is deposited in wet coating process on flexible substrates and afterwards the periodic microstructures are embossed in the deposited layer. Afterwards the deposited layer or multilayer is broken into flakes.

In an advantageous embodiment, the invention relates to a second manufacturing process for a ZOD pigment comprising the steps of: (c.f. FIG. 2.1a)

a) depositing on a flexible substrate a first layer which is embossable and dissolvable in a first solvent; and b1) embossing a periodic microstructure in the first layer;

c1) depositing on the embossed first layer a second layer which is insoluble in said first solvent and has an index of refraction $n_2$;

d1) separating said flexible substrate from said first layer by contacting it with said first solvent, wherein the second layer breaks into flake shape substrates;

e) coating the obtained flake shaped substrate with a third layer, wherein said third layer has an index of refraction $n_3 > n_2 + 0.25$.

In a further advantageous embodiment, the invention relates to a third manufacturing process for a ZOD pigment comprising the steps of: (c.f. FIG. 2.1b)

a) depositing on a flexible substrate a first layer which is dissolvable in a first solvent;

b2) depositing on said first layer a second layer which is embossable and insolvable in said first solvent and has an index of refraction $n_2$;

c2) embossing a periodic microstructure in said second layer;

d2) separating said flexible substrate from said first layer by contacting it with said first solvent, wherein said second layer breaks into flake shape substrates; and e) coating the obtained flake shaped substrate with a third layer, wherein said third layer has an index of refraction $n_3 > n_2 + 0.25$.

Both, second and third manufacturing process, contain of two sub-processes, namely the manufacturing of a micro-structured flake shaped substrate (steps a) to d)) and the manufacturing of a ZOD pigment, starting from a micro structured flake shaped substrate (step e)). Consequently, the invention relates to the manufacturing of a micro-structured flake shaped substrate and to the manufacturing of a ZOD pigment. In one embodiment, steps a) to d) are adapted to a R2R process, while step e) is adapted to a discontinuous process.

Figure 21:
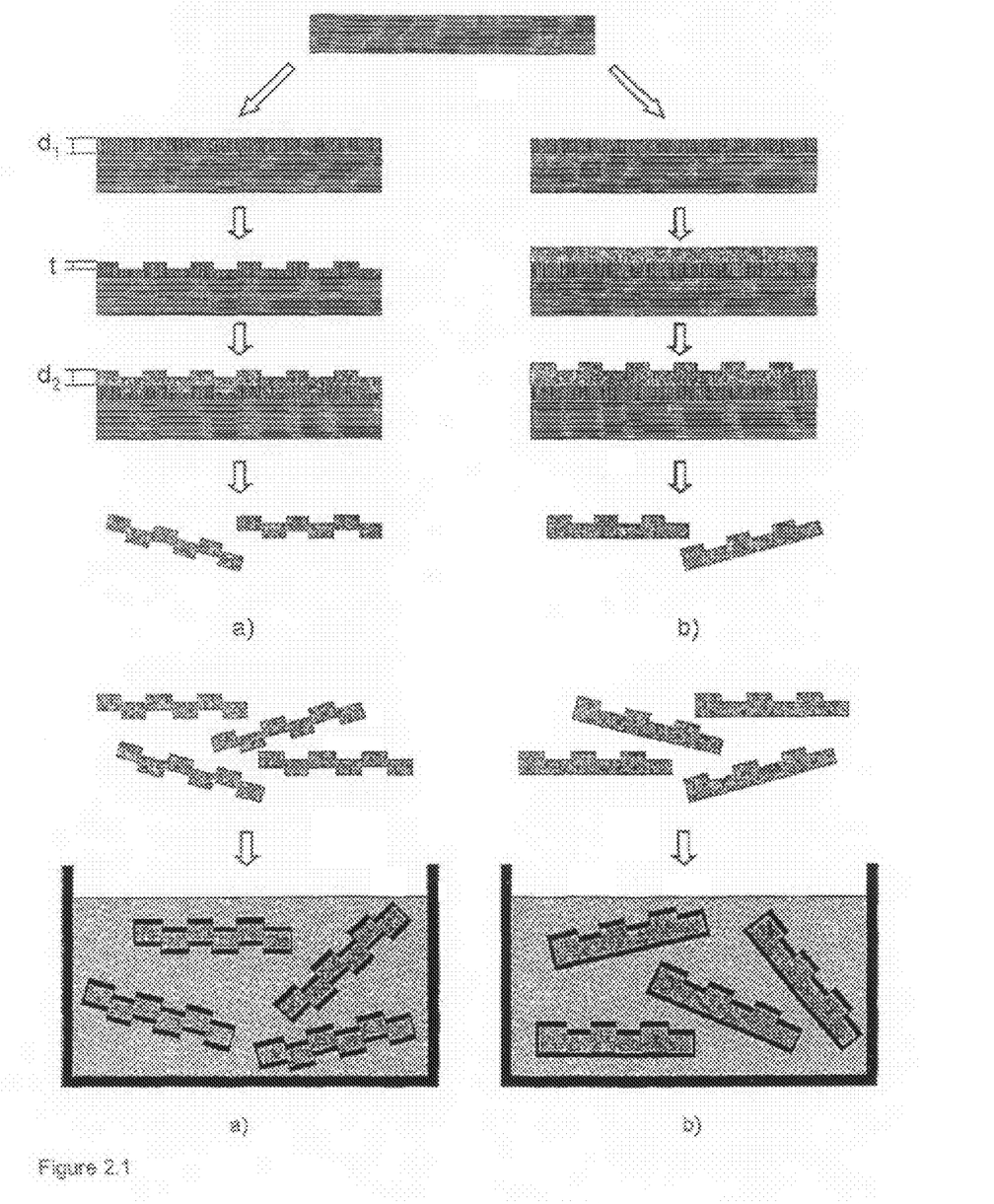

As discussed above, the second process comprises the steps a), b1), c1), d1) and e), while the third process comprises the steps a), b2), c2), d2) and e). These steps and the materials suitable for it are described in further detail below. Reference is also made to FIG. 2.1, schematically illustrating these steps.

Step a): On a flexible substrate an embossable first layer which can be dissolved in a first solvent is deposited. This can be done for example by roll-to-roll curtain- or cascade coating or gravure printing. The deposition speed with these techniques can be up to several hundreds of meters per minute on flexible web substrates with a web width on the order of one meter. Suitable materials for the flexible substrates are polymer foils for example PET, PEN, PP, PMMA, PS, MOPP, PE, PC and PVC. The thickness of the flexible substrates may be varied in a broad range, but is preferably between 5 μm and 500 μm, especially preferably between 12 μm and 250 μm. Such materials are commercially available or obtainable according to known processes. Suitable materials for the first layer are polymers which are embossable and soluble in a solvent, for example Polyester or Nitrocellulose-derivatives. Examples of water soluble and embossable polymers are poly(vinyl pyridine) PVP or poly(vinyl alcohol) PVA. The thickness $d_1$ of the first layer is typically between 50 nm and 10 μm, preferred between 100 nm and 3 μm, especially preferred between 300 nm and 2000 nm. Suitable solvents for this process step can be chosen according to the selection of material for the first layer. Preferred are environmental friendly solvents. Typically, water, ethanol, isopropanol and its mixtures are used.

Step b1) Next the periodic microstructure is embossed in the first layer. This can be done for example by roll-to-roll hot or cold embossing, wherein the surface of a roll bears the periodic microstructure. Typically this is done by placing a nickel shim around a roll. The periodic micro-structure is as defined above. Pigment shape defining edge knife structures as described in the first method may be used.

Step c1) Next, a second layer which is insoluble in the first solvent and transparent at least in the visible spectral range is deposited on the first layer, wherein transparent means that the average transmission is >75%, preferred >90%. The thickness $d_2$ of this second layer must be larger than the depth t of the grating. This ensures to obtain stable flake shaped substrates. Preferred $d_2$ is in the range of 100 nm up to 2000 nm. The deposition can be done by vacuum processes like for example evaporation, sputtering or chemical vapour deposition (CVD). Suitable materials for this second layer are polymers such as poly(p-xylylene) PPX, or inorganic metal oxides or metal halogenides, for example $MgF_2$, $Al_2O_3$ or $SiO_2$. Wet coating techniques like roll-to-roll curtain- or cascade coating or gravure printing are another possibility to deposit the second layer. Examples of materials which can be wet coated and which are insoluble in aqueous solutions are nitrocellulose NC or polystyrene PS. If the second layer is deposited by vacuum deposition the second surface of the second layer, which is not in contact with the first layer, can possess the subwavelength grating structure. This is shown in FIG. 2.1a). Depending on the material involved and the layer thickness the grating depth and profile may or may not differ on both surfaces. If wet coating techniques are used this second surface will be in most cases uncorrelated with the first surface (not shown in FIG. 2.1a).

Step d1): Next, the second layer is separated from the flexible substrate by contacting the first layer with a first solvent. Such contact may result in a partial or complete solution of the first layer. The second layer breaks into flakes during the dissolving step.

In an advantageous embodiment, the step d1) can be done in a roll-to-roll process.

In an advantageous embodiment, step d1) may be supported by ultrasonic treatment (US).

In an advantageous embodiment, a porous layer located between the flexible substrate and the first layer is deposited before or together with the first layer. This porous layer can support the dissolving of the first layer by the first solvent as the first solvent can fill the porous and thus reach the first layer from the flexible substrate side. The porous layer can be deposited by known techniques, e.g. as described in the EP1464511, from a dispersion containing inorganic nanoparticles, e.g. silica or boehmit.

Step b2): A second layer, which is embossable and which is insoluble in the above identified first solvent, is deposited on the above identified first layer. Preferred $d_2$ is in the range of 100 nm up to 2000 nm. The same deposition techniques as for the first layer can be used. The second layer can be deposited from micro spheres containing aqueous dispersion. Possible materials are for example Latex or PS micro spheres.

Step c2): Next, the embossing of the periodic microstructure in the second layer takes place. This can be done as described in connection with b1, e.g. by roll-to-roll hot embossing. If the second layer is made of polymeric micro spheres the hot embossing, which is done preferred above the glass transition temperature of the polymeric material, leads to a melting or sealing of the layer. Thus after the hot embossing such a layer is insoluble in water although it was deposited from aqueous solution. Depending on the elastic and plastic properties of the material of the first and the second layer the periodic microstructure is embossed in the upper surface of the second layer or in both surfaces.

Step d2) The second layer is separated from the flexible substrate and forms the flake shaped substrates as described above (d1).

In an advantageous embodiment of this third process the deposition of said first and said second layer takes place simultaneously, e.g. by curtain- or cascade coating.

In a further advantageous embodiment of this third process the deposition of said first layer, said second layer and said porous layer takes place simultaneously, e.g. by curtain- or cascade coating.

In an advantageous embodiment of both processes the size and shape of the flakes can be influenced by manufacturing (e.g. embossing) predetermined breaking points or ~lines into the first or the second or in both layers. These breaking points can be for example parallel lines in x- and y-direction. Preferred the thickness of the lines is thin, which means smaller than 3 µm, especially smaller than 1.5 µm. The spacing between the lines is preferred between 1 µm and 100 µm, especially preferred between 2 µm and 20 µm. It was found that an asymmetric shape of the pigments helps to align pigments during the pigment coating process. Such alignment is needed to realise a colour effect upon rotation on products coated with such ZOD pigments. Such breaking points/lines may be manufactured prior, after or simultaneously with embossing of the ZOD microstructure. In a preferred embodiment, the breaking points are embossed together with the periodic microstructure. In this embodiment, the embossing tool comprises the ZOD microstructure and the structure of the ZOD pigments. Thus, no additional equipment is needed.

Step e) Manufacturing of zero-order diffractive pigments: In this step, the flake shaped substrate is coated with a waveguiding layer which is i) transparent; ii) possesses a high index of refraction and iii) has a suitable thickness. The thickness is typically in the range of 50 nm to 500 nm, preferred between 80 nm and 150 nm. The transparency may be chosen according to the need of the end user, typically values above >75%, preferred >90%, are suitable.

In many applications pigments are embedded in a polymer matrix with an index of refraction on the order of 1.5 at a wavelength of 550 nm. For such applications, the waveguiding layer must be made of a material with an index of refraction at least >1.75.

The waveguiding layer may be deposited using known methods. In an advantageous embodiment, the waveguiding layer is deposited in a tank from gaseous or liquid phase. Deposition in a tank is considered advantageous when compared to other methods, in particular to a vacuum-process, due to its huge mass production capability and thus low cost. For example an HRI layer of metal oxide can be deposited on the substrate by hydrolyzing the corresponding water-soluble metal compounds. Optionally the layer can be calcinated. Non-limiting examples of such metal oxides are $TiO_2$, $ZrO_2$, $Cr_2O_3$ or ZnO. All transparent materials fulfilling the requirements of the needed index of refraction and transparency may be used.

FIG. 2.1 shows schematically the deposition from solution of a waveguiding layer on flake shaped substrates with sub-wavelength grating on both surfaces (2.1a) and on only one surface (2.1b). In most cases the waveguiding layer grows on both surfaces of the flakes. This enables the manufacturing of pigments with multi stacked zero-order diffraction filters with only one HRI layer deposition step.

If the flake shape substrates are thin enough, which means $d_2 < 2$ µm, preferred $d_2 < 1$ µm, additional interference effects can take place. Thus, the invention also relates to ZOD pigment, wherein the pigments consist of a substrate having a thickness below 2 micrometers.

In the case of flake shape substrates with periodic microstructures on both surfaces interference effects of two zero-order diffraction filters are present. This leads to stronger reflection characteristics as described in WO06/038120A1. Thus, the invention also relates to ZOD pigment, wherein the particles have a periodic microstructure on both surfaces.

In the case of flake shaped substrates with the periodic microstructure on only one surface the deposition of the high index of refraction layer on both surfaces leads to pigments with a ZOD filter on one surface and a flat waveguiding layer on the other surface. In this case interference effects of a zero-order diffractive filter and a thin waveguiding layer take place. For example the light propagating in the leaky waveguiding layer of the ZOD filter can couple to the flat waveguiding layer.

In a further embodiment the present invention relates to ZOD pigments wherein said third layer consists of more than one sub-layer. Highly complex multi stacked ZOD pigments can be realised by repeating the described liquid or gaseous deposition processes with alternating low and high index of refraction materials on the flake shaped substrates. Suitable low index of refraction materials are e.g. $SiO_2$, $Al_2O_3$ or AlOOH. Further suitable materials are metals such as Ag, Au, Al, Cu, provided the deposited layers are thin. In this context, thin layers are less than 100 nm thick, preferably in the range of 10 to 50 nm. Such layers may be applied by liquid or gaseous deposition. Thus, in a preferred embodiment, the present invention relates to a process wherein the coating step e) takes place repeatedly using coating materials with different indices of refraction.

In a third aspect, the invention relates to the use of ZOD pigments, as described herein. In general, ZOD pigments may be used like known pigments in all fields where pigments are used.

Preferably, ZOD pigments can be used in fields like identification, authentication and security, branding and marketing as well as decoration, paints, coatings and cosmetics.

Examples of applications are security devices in banknotes, credit cards, passports or for anti-counterfeiting and brand protection. Other possible applications are paints or coatings for automotive or packaging.

ZOD pigments, in particular when embedded in a paste, liquid, powder or polymer may be used in pharmaceutical formulations (e.g. tablets), food, colour coating for cars, plastics, metals, paper and the like.

ZOD pigments coated with a polymer, sugar etc. to make a small powder particle mixed into other powder particles, are useful in pharmaceutical tablets, food or sun cream and the like To further illustrate the invention, the following examples are provided. These examples are provided with no intend to limit the scope of the invention

EXAMPLE 1

On a PET foil (23 micrometer thick) a water soluble PVA layer (1000 nm thick) is applied by gravure printing. Next, a ZOD microstructure is embossed in this PVA layer with a R2R Ni-shim at 100° C. Next, ZnS layer (190 nm thick) is deposited in an evaporation chamber. Pigments are obtained from the coated foil by dissolving the PVA layer in water at room temperature, whereby the hard ZnS layer brittles into small particles of some micrometer in diameter. The size of these particles may be further reduced by US treatment; the size distribution may be reduced by centrifugation or sieving. The obtained pigments show a pronounced colour effect.

EXAMPLE 2

The procedure of ex. 1 is followed, with the exception that the Ni-shim also applies predetermined braking lines of 10*50 micrometers. The obtained pigments show a pronounced colour effect, no US treatment or steps to amend the size distribution are needed.

The invention claimed is:

1. A zero-order diffractive pigment, comprising an optical wave-guiding layer whereas said layer is
   made of a material with an index of refraction that is higher than the index of refraction of an adjacent material by at least 0.25;
   has a zero-order diffractive grating structure with a period between 300-500 nm and a grating depth between 30-300 nm; and
   has a thickness between 50 nm and 500 nm.

2. Pigment according to claim 1 wherein the zero-order diffractive grating structure possesses a period that is smaller than the wavelength of the light which shall be reflected in the zeroth reflection order.

3. Pigment according to claim 1 having an anisotropic lateral shape.

4. Pigment according to claim 1 containing a magnetic layer.

5. Pigment according to claim 1 containing multilayer systems.

6. Pigment according to claim 1 wherein one or more optical waveguiding layers are embedded in an organic or inorganic droplet and are fixed within this droplet.

7. Pigment according to claim 1 wherein the optical waveguiding layer is made of material suitable for human administration, and wherein said pigment is embedded in a digestible matrix.

8. Pigment according to claim 7 wherein the optical waveguiding layer is $TiO_2$, and wherein said pigment is embedded in a digestible matrix.

9. Matrix comprising pigments according to claim 1.

10. The matrix of claim 9 which is a coating, glaze or lacquer.

11. Process, in particular a roll-to-roll process, for manufacturing ZOD pigments according to claim 1, comprising the steps of:
    depositing and optionally micro-structuring on a substrate a first layer which is dissolvable in a first solvent;
    manufacturing one or more layers of said ZOD pigments by one or more deposition steps and optionally one or more micro-structuring steps wherein all additional layers are insoluble in said first solvent;
    dissolving said first layer for obtaining ZOD substrates or ZOD pigments;
    optionally subjecting the thus obtained ZOD substrates or ZOD pigments to one or more further coating steps; and/or
    optionally subjecting the obtained ZOD substrates or ZOD pigments to one or more selection steps as to size and/or shape wherein at least one micro-structuring step takes place.

12. Process according to claim 11 comprising the steps of:
    a) depositing on a flexible substrate a first layer which is embossable and dissolvable in a first solvent;
    b) embossing a periodic microstructure in the first layer;
    c) depositing on the embossed first layer a second layer which is insoluble in said first solvent and has an index of refraction n2;
    d) separating said flexible substrate from said first layer by contacting it with said first solvent, wherein the second layer breaks into flake shape substrates;
    e) coating the obtained flake shaped substrate with a third layer, wherein said third layer has an index of refraction n3>n2+0.25; or
    a) depositing on a flexible substrate a first layer which is dissolvable in a first solvent;
    b) depositing on said first layer a second layer which is embossable and insolvable in said first solvent and has an index of refraction n2;
    embossing a periodic microstructure in said second layer;
    d) separating said flexible substrate from said first layer by contacting it with said first solvent, wherein said second layer breaks into flake shape substrates;
    e) coating the obtained flake shaped substrates with a third layer with an index of refraction n3>n2+0.25.

13. Process according to claim 12, wherein the coating step e) takes place in a wet or gaseous phase.

14. Process according to claim 12, wherein step (d) is complemented by a collection and purification step.

15. Process according to claim 12, wherein a porous layer is deposited on said flexible substrate prior to or simultaneously with the deposition of said first layer.

16. Process according to claim 12, wherein the first layer consists essentially of PVA or PVP.

17. Process according to claim 12, wherein the first solvent consists essentially of water.

18. Process according to claim 12, wherein the second layer consists essentially of $MgF_2$, $SiO_2$, Latex or PS.

19. Process according to claim 12, wherein coating step (e) takes place repeatedly by using different coating materials having a different index of refraction.

20. Process according to claim 12, comprising the following steps:
    a) hot- or cold embossing of a periodic microstructure ("the grating") into a deformable polymer foil or deformable layer on a polymer foil;
    b) deposition of at least one HRI layer, in particular by thermal evaporation, plasma deposition, sputtering or gravure printing;
    c) dissolving the embossing layer and peeling of the pigments mechanically;
    d) optionally narrowing down the size distribution by selecting HRI pigments according to the desired size and shape;
    e) embedding he HRI pigments in paste or powder or distributing the HRI pigments in a liquid or paste.

21. Process according to claim 20, wherein all process steps are adapted to a roll-to-roll process.

22. Process according to claim 12, wherein predetermined breaking points or ~lines are embossed prior, simultaneously or subsequently, to the embossing of the periodic microstructure.

23. The process according to claim 22 where the predetermined breaking points or ~lines are embossed simultaneously to the embossing of the periodic microstructure.

24. Use of ZOD pigments according to claim 1 in the fields of identification, authentication and security, branding, marketing, decoration, cosmetic formulations, pharmaceutical formulations.

25. Paint, coating, glaze or ink containing a ZOD pigment according to claim 1.

* * * * *